United States Patent
Balasubramanian et al.

(10) Patent No.: US 12,160,845 B2
(45) Date of Patent: Dec. 3, 2024

(54) VEHICLE-TO-PEDESTRIAN POSITIONING WITH JOINT LOCALIZATION IN VEHICLES

(71) Applicant: QUALCOMM Incorporated, San Diego, CA (US)

(72) Inventors: Anantharaman Balasubramanian, San Diego, CA (US); Kapil Gulati, Belle Mead, NJ (US); Chang-Sik Choi, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/364,435

(22) Filed: Aug. 2, 2023

(65) Prior Publication Data
US 2023/0413227 A1    Dec. 21, 2023

Related U.S. Application Data

(62) Division of application No. 16/942,725, filed on Jul. 29, 2020, now Pat. No. 11,770,793.

(51) Int. Cl.
*H04W 64/00* (2009.01)
*G01S 19/51* (2010.01)
(Continued)

(52) U.S. Cl.
CPC ........... *H04W 64/006* (2013.01); *G01S 19/51* (2013.01); *H04W 4/029* (2018.02); *H04W 4/06* (2013.01); *H04W 8/24* (2013.01)

(58) Field of Classification Search
CPC ......... H04W 4/80; H04W 4/90; H04W 8/005; H04W 76/40; H04W 88/06; H04W 4/40;
(Continued)

(56) References Cited

U.S. PATENT DOCUMENTS

2016/0205499 A1 * 7/2016 Davydov .............. G01S 5/0236
                                                                    455/456.1
2018/0035255 A1 * 2/2018 Kordybach ............. H04W 4/40
(Continued)

FOREIGN PATENT DOCUMENTS

EP          3681247 A1      7/2020

OTHER PUBLICATIONS

Huawei, et al., "Further Update of Solution 15 for Enhancement to LCS Architecture", 3GPP Draft, SA WG2 Meeting #129, S2-1811105 Was S2-1810781_FURTHER_UPDATES_OF_SOLUTION_15_CL_V1, 3rd Generation Partnership Project (3GPP), Mobile Competence Centre, 650, Route Des Lucioles, F-06921 Sophia-Anti Polis, Ced, vol. SA WG2, No. Dongguan, P. R. China, Oct. 15, 2018-Oct. 19, 2018, 7 Pages, Oct. 17, 2018 (Oct. 17, 2018), XP051539960.
(Continued)

*Primary Examiner* — Fred A Casca
(74) *Attorney, Agent, or Firm* — Thien T. Nguyen

(57) ABSTRACT

A vehicle-enabled user equipment (VUE) and related techniques are disclosed. In one aspect, the VUE issues a periodic broadcast, or signals a response to a requesting source, identifying its location management capability (LMC). The UE forms a link with a recipient VUE of the broadcast to perform joint localization of the pedestrian UE (PUE). Joint localization by VUE and another VUE may be performed by VUEs and PUEs in the region exchanging ranging signals and ego measurements. The VUE determines a location jointly of the PUE. The location can be determined upon a request, periodically, or in response to a triggered event.

26 Claims, 11 Drawing Sheets

(51) Int. Cl.
  *H04W 4/029* (2018.01)
  *H04W 4/06* (2009.01)
  *H04W 8/24* (2009.01)

(58) Field of Classification Search
  CPC ......... H04W 4/46; H04W 4/023; H04W 4/02;
       G01S 5/0289; H04L 67/12
  See application file for complete search history.

(56) References Cited

U.S. PATENT DOCUMENTS

| | | |
|---|---|---|
| 2021/0149417 A1 | 5/2021 | Koch et al. |
| 2021/0243720 A1 | 8/2021 | Farag et al. |
| 2022/0039054 A1 | 2/2022 | Balasubramanian et al. |
| 2022/0150865 A1* | 5/2022 | Cha .................. G01S 5/011 |
| 2022/0342028 A1 | 10/2022 | Sun et al. |

OTHER PUBLICATIONS

Retrieved from the Internet: URL: http://www.3gpp.org/ftp/tsg%5Fsa/WG2%5FArch/TSGS2%5F129%5FDongguan/Docs/S2%2D1811105%2Ezip [retrieved on Oct. 17, 2018] Sections 1, 2, Sections 6.15.1, 6.15.2.
International Search Report and Written Opinion—PCT/US2021/039878—ISA/EPO—Sep. 28, 2021.
International Preliminary Report on Patentability—PCT/US2021/039878 The International Bureau of WIPO—Geneva, Switzerland, Feb. 9, 2023.

* cited by examiner

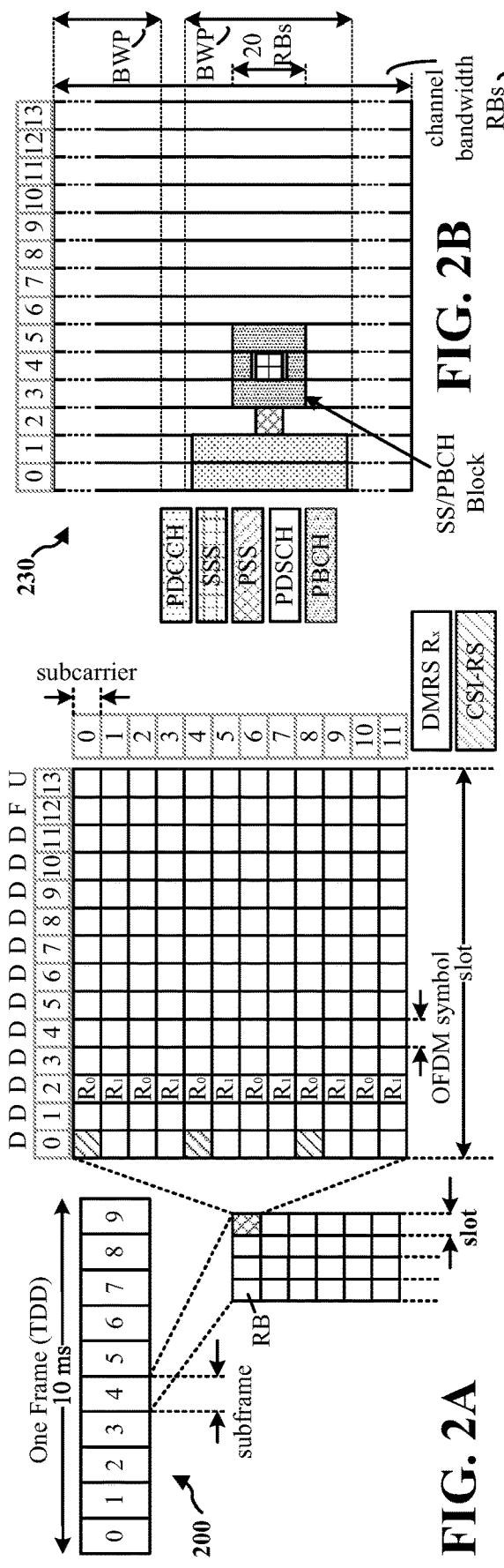
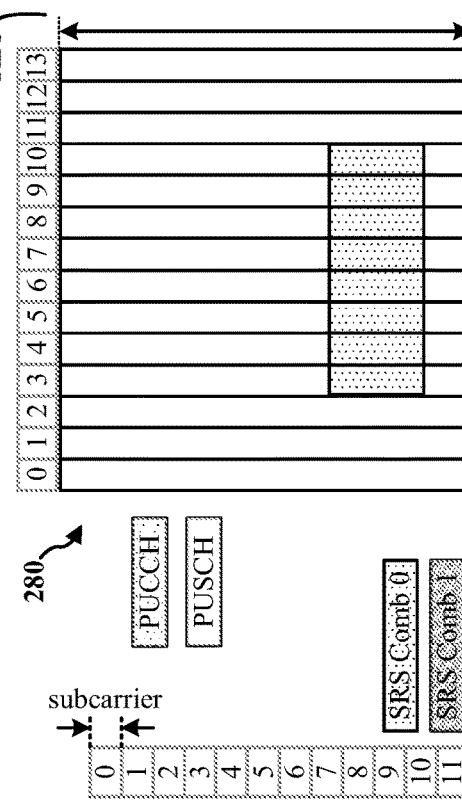
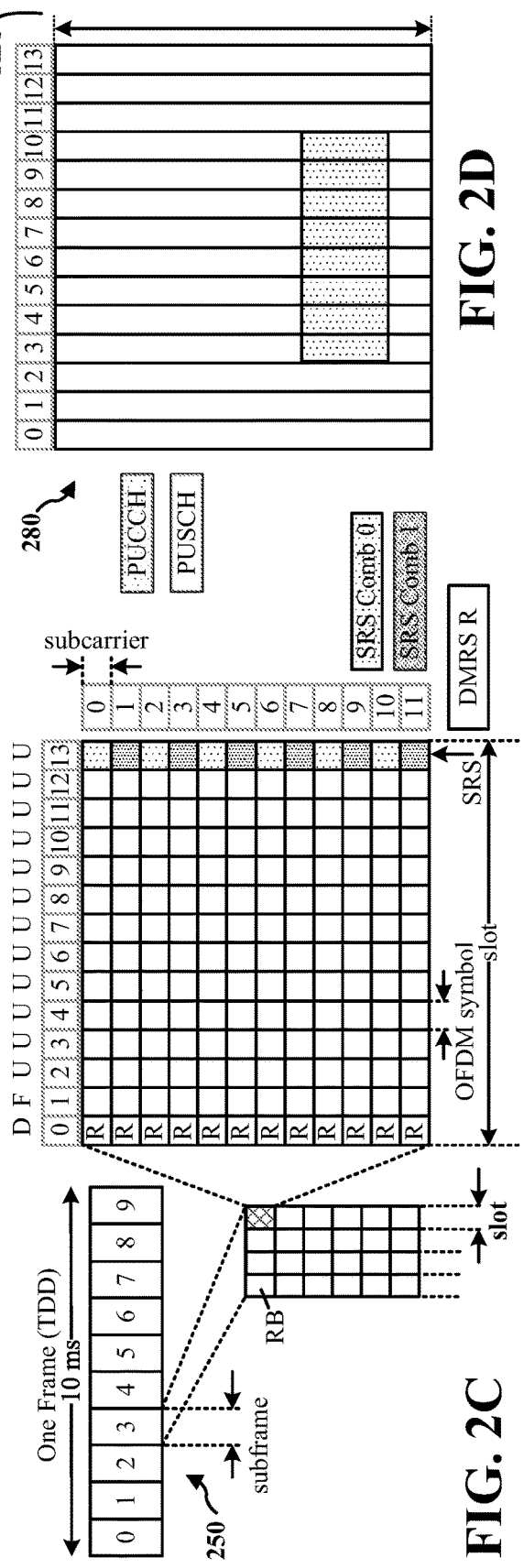
FIG. 2A
FIG. 2B
FIG. 2C
FIG. 2D

VEHICLE-TO-PEDESTRIAN POSITIONING WITH JOINT LOCALIZATION IN VEHICLES

CROSS-REFERENCE TO RELATED APPLICATION(S)

This application is a divisional application of U.S. application Ser. No. 16/942,725, entitled "VEHICLE-TO-PEDESTRIAN POSITIONING WITH JOINT LOCALIZATION IN VEHICLES", and filed on Jul. 29, 2020, which is expressly incorporated by reference herein in its entirety.

BACKGROUND

Technical Field

The present disclosure relates generally to communication systems, and more particularly, to a vehicle-based user equipment for locating pedestrians and other vehicles.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Vehicle-to-everything (V2X) technology allows vehicles to communicate with aspects of their environment such as street lights and other vehicles using wireless technology. V2X offers numerous benefits and serves as a fundamental enabling technology for future implementations such as driverless cars. V2X includes within its scope V2P, which enables vehicles to communicate with pedestrians. Safety and vehicle autonomy are exemplary factors that relate to this technology. However, for a variety of reasons, a given vehicle may not be able to obtain accurate positioning of the pedestrian.

Accordingly, in an aspect of the disclosure, a method, a computer-readable medium, and an apparatus are provided. The method includes issuing, by a vehicle user equipment (VUE), a broadcast identifying a location management capability of the VUE. The method further includes forming a link with a recipient VUE of the broadcast to localize a pedestrian UE (PUE).

The computer-readable medium includes storing executable code for a vehicle-enabled user equipment (VUE). The code when executed by a processor causes the processor to issue a broadcast identifying a location management capability of the VUE. The code further causes the processor to form a link with a recipient VUE of the broadcast to localize a pedestrian UE (PUE).

The apparatus includes a vehicle-enabled user equipment (VUE). The VUE includes a processor. The processor is configured to issue a broadcast identifying a location management capability of the VUE. The processor is further configured to form a link with a recipient VUE of the broadcast for localizing a pedestrian (PUE).

The apparatus also includes another aspect of a vehicle-enabled user equipment (VUE). The VUE includes means for issuing a broadcast identifying a location management capability of the VUE. The VUE further includes means for forming a link with a recipient VUE of the broadcast to localize a pedestrian UE (PUE).

In another aspect of the disclosure, a method, a computer-readable medium, and an apparatus are provided. The method includes signaling, by a vehicle user equipment (VUE), a pedestrian UE (PUE) that the VUE has location management capability (LMC). The method further includes exchanging location information with the PUE. The method also includes calculating, jointly with a second LMC-based VUE using the location information, a location of the PUE.

The computer-readable medium includes storing executable code for a vehicle-enabled user equipment (VUE). The code when executed by a processor causes the processor to signal a PUE that the VUE has location management capability (LMC). The code further causes the processor to exchange location information with the PUE. The code also causes the processor to calculate, jointly with a second LMC-based VUE using the location information, a location of the PUE.

The apparatus includes a vehicle-enabled user equipment (VUE). The VUE includes a processor. The processor is configured to signal a PUE that the VUE has location management capability. The processor is further configured to exchange location information with the PUE. The processor is also able to calculate, jointly with a second LMC-based VUE using the location information, a location of the PUE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
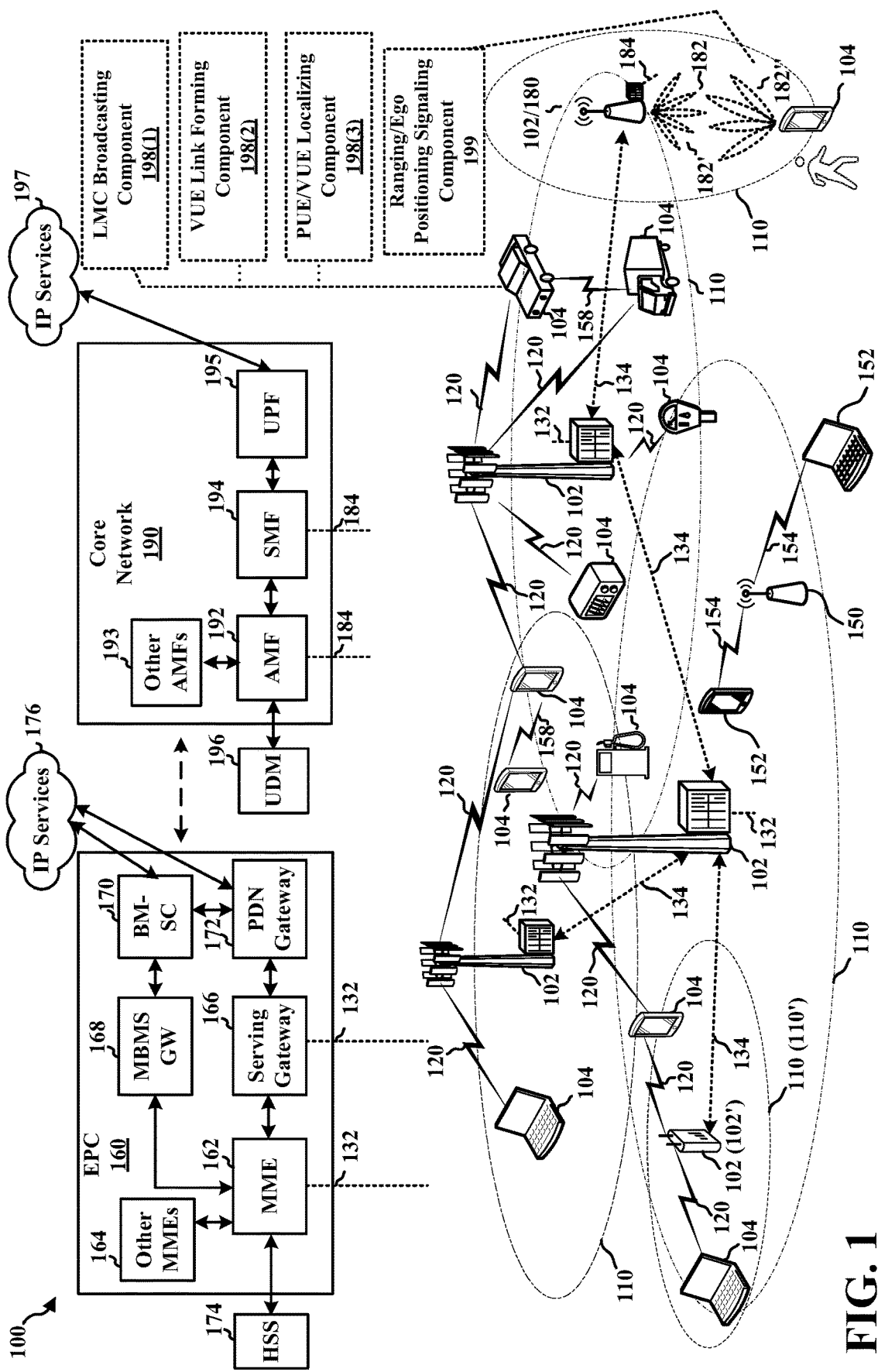
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As shown in FIG. 1, the vehicle 104 may also be called a vehicle user equipment or VUE 104. Similarly, a pedestrian may carry a mobile device with the capabilities described in this disclosure as a pedestrian UE or PUE. Referring again to FIG. 1, in certain aspects, the truck shown as VUE 104 may be configured to include an LMC broadcasting component 198(1), a VUE link forming component 198(2), a PUE/VUE localizing component, and an ranging/ego positioning signaling component 199. The LMC broadcasting component 198(1) may be configured to issue a broadcast (or in alternative configurations, to exchange information in V2X messages) identifying the location management component capability of a VUE 104. For purposes of this disclosure, the location management component capability is sometimes referred to herein as simply location management capability (LMC), LMC capability, LMC-based or having location management functionality (LMF). VUE 104 may further include a VUE link forming component 198(2). Where VUE 104 has LMC capability, it may be configured to form a sidelink with another LMC-based VUE to perform localization of a PUE or another VUE, or itself.

To that end, VUE 104 may further include PUE/VUE localizing component 198(3), in which VUE 104 may cooperate with other UEs in the vicinity to perform off-network location calculations, e.g., for a pedestrian or a vehicle, to navigate or to avoid a collision, without cellular capability. VUE 104 may also be equipped with a ranging/ego positioning signaling component 199, in which VUE 104 can send and receive ranging signals and ego measurements and obtain location information based on these signals for localizing another VUE/PUE.

The above components 198(1)-(3) and 199 may be performed by one or more processors, or by specialized hardware such as digital signal processors, field programmable gate arrays, integrated circuits using collections of logic gates and other digital circuits, etc. Although the following description may be focused on V2X technologies, the concepts described herein may be applicable to other positioning technologies, including for example proximity-based systems, acoustic location systems, and infrared positioning systems. Further, although the following description may be focused on 5G NR, the concepts described herein may be equally applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
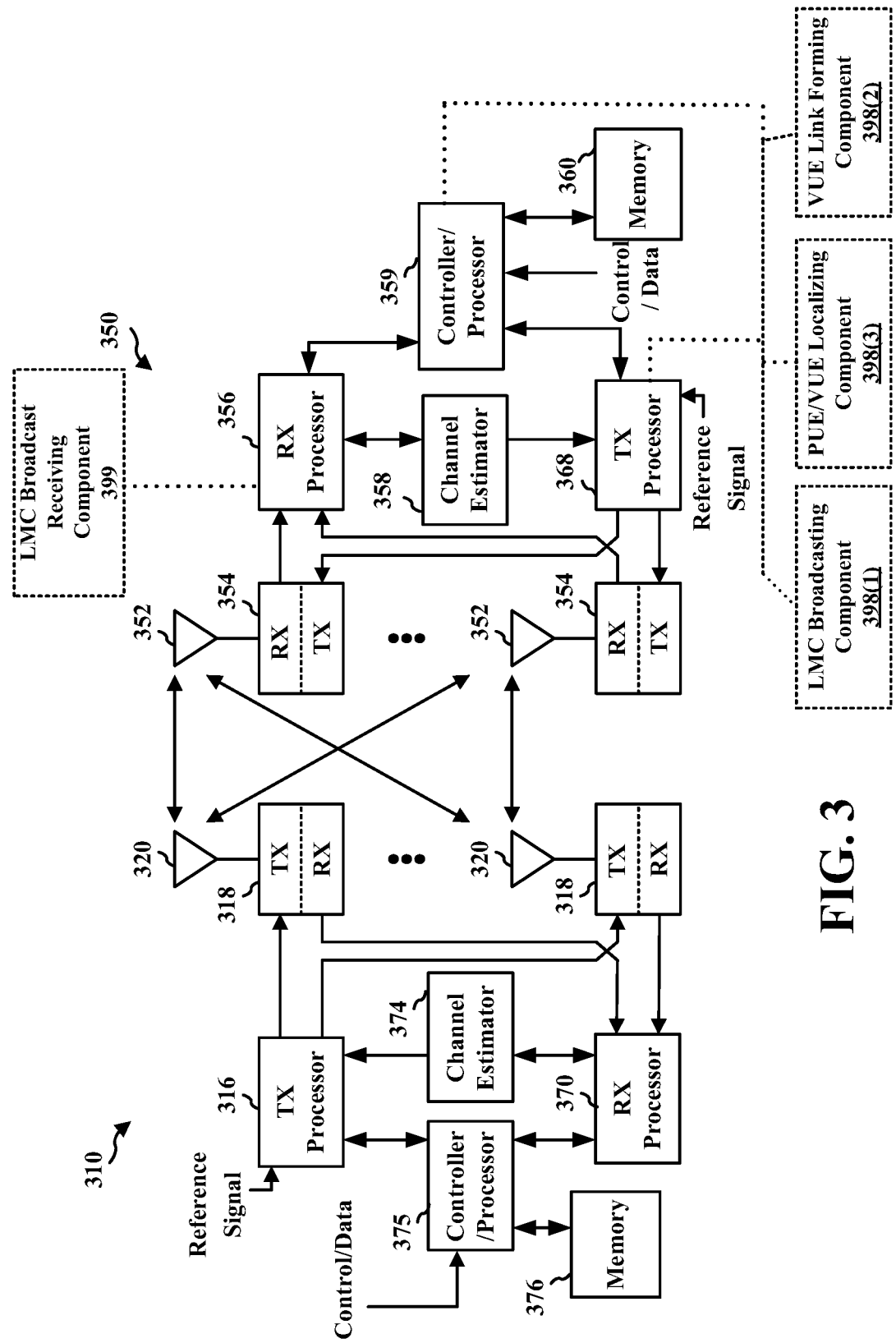
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with components 198(1)-(3) and 199 of FIG. 1. In addition, in certain configurations the UE may be a VUE that includes an LMC broadcasting component 398(1), a PUE/VUE localizing component 398(3), and a VUE link-forming component 398(2). These components, which are described in part in FIG. 1 and are discussed in detail below, may be implemented in FIG. 3 by the elements identified above, or in whole or in part by one or more dedicated or specialized processors, digital signal processors, or dedicated logic circuits.

Figure 4:
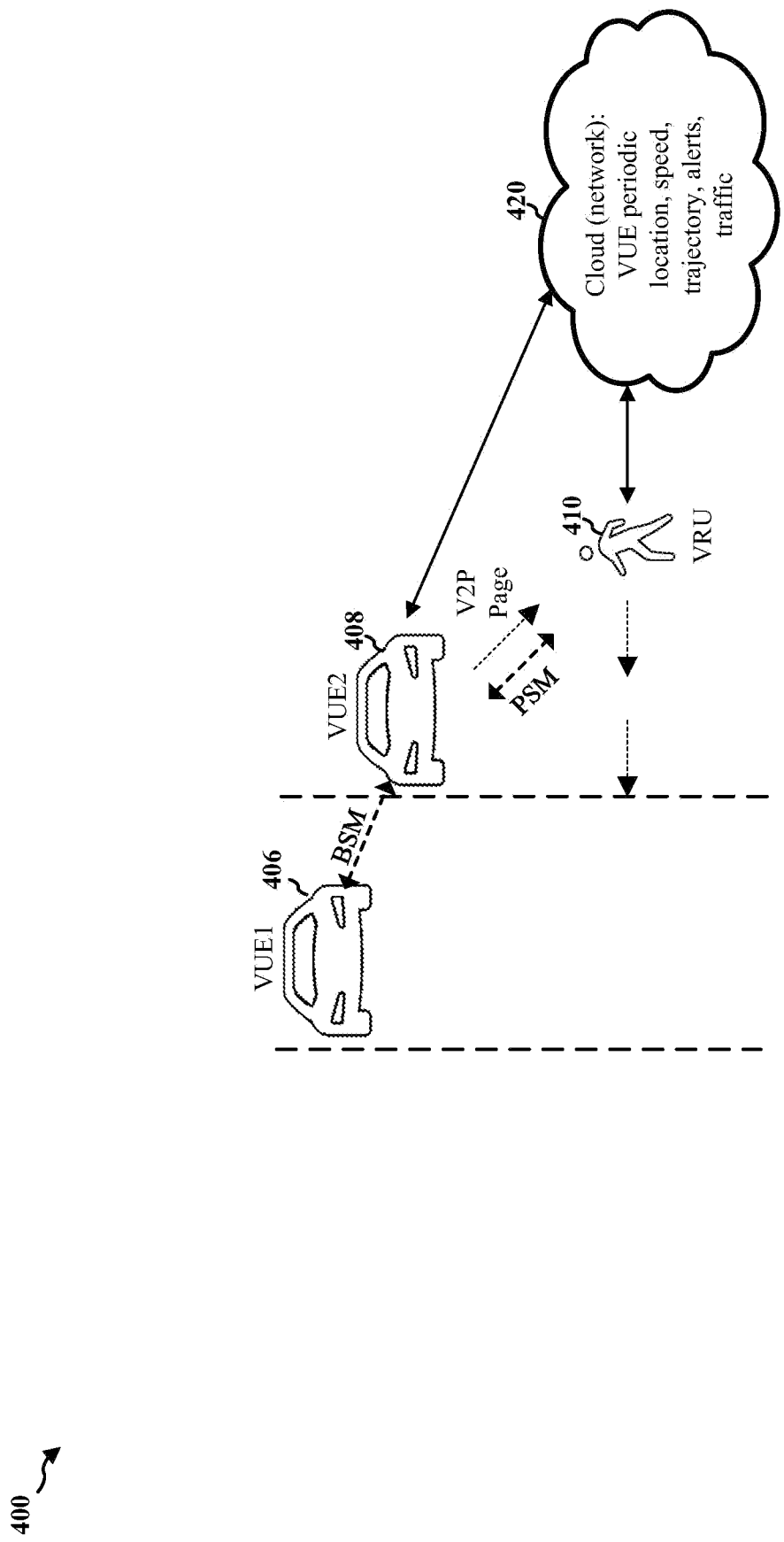
FIG. 4 is a conceptual diagram of two vehicle with user equipment technology (VUEs) in communication over a V2X sidelink and a vulnerable road user (VRU) in their proximity.

FIG. 4 is a conceptual diagram of two vehicles with user equipment technology (VUEs) in communication over a V2X sidelink, and a vulnerable road user (VRU) in their proximity. A vehicle having an integrated vehicle user equipment VUE1 (406) can exchange messages wirelessly with another vehicle having VUE2 (408), while the vehicles are in proximity such as being in adjacent lanes of a road. A VRU 410, such as a pedestrian, may be walking or cycling near the road with a pedestrian user equipment (PUE) in the pedestrian's possession, such as a cellular device. The VRU 410 may be obtaining via the cellular network 420 information about nearby vehicles such as their periodic locations, speeds, trajectory (direction), any alerts in the area, and information about traffic. This information may similarly be made available via the separate network connections of VUE1 and VUE2.

With continued reference to FIG. 4, V2V may enable VUE1 and VUE2 to exchange a periodic basic safety message (BSM) over the cellular network. A BSM is a message with data that includes information related to other vehicles and traffic such as that vehicle's speed, position and heading. VUE1 406 and VUE2 408 can use the information included in these messages to ensure that they are at a safe distance from each and are not headed in a collision course, for example. The BSM may be transmitted over a short range at low frequencies to avoid interfering with other signals. In some configurations, BSMs may be augmented with information obtained from the cellular network. A vehicle may also use V2P principles to alert the pedestrian's PUE of the vehicle via a V2P page. The pedestrian may send to VUE2 a pedestrian safety message (PSM). The PSM may include the pedestrian's speed, direction, pedestrian type (such as a walker, cyclist, etc.) and other information.

The messages described in FIG. 4 generally relate to aspects of wireless communication and coordination technologies known as "vehicle-to-everything" ("V2X"). V2X includes within the scope of this technology numerous subsets of wireless technologies, some of which include "V2V", which refers to wireless communications between vehicles, "V2P", which encompasses wireless communications between vehicles and pedestrians or other vulnerable road units (VRUs), vehicle-to-infrastructure (V2I) (vehicles and traffic signals, buildings, bridges, etc.), and the like. In general, V2X uses cellular technology to provide vehicles with the ability to communicate with each other and with the environmental infrastructure in the vehicle's proximity. The technology enables vehicles to have a level of autonomy and also attempts to provide safer and efficient roadways by allowing the vehicle to automatically identify pedestrians and other obstacles and to take evasive maneuvers, if necessary.

Ordinarily, the modes of communications described in FIG. 4 may be facilitated directly by the cellular network 420, which as shown can store the necessary data relevant to the vehicle's territory and which can be used for transmitting and receiving public safety messages and other communications affecting the vehicle. However, is some cases the cellular network cellular 420 may be unavailable. The network may be experiencing bandwidth limitations in the area and updates may not be as fast as needed. These limitations are particularly important in urgent situations involving a potential collision, where cell towers and other hardware may not be available or may be inoperable in the area to inform the vehicle of the potential danger. V2X has consequently developed modes of transmission for use directly between vehicles over a sidelink channel using the PC5 interface.

As an example of the utility of V2X, vehicles that use wireless signals to communicate with nearby vehicles and pedestrians or other VRUs can exchange critical information such as vehicle speed and location. Certain aspects of V2X positioning and vehicle-based technology are ultimately geared toward the expected future implementation of autonomous vehicles that can operate in "driverless" environments. V2X technology can also be used to promote safety and efficient transportation by enabling vehicles to locate other vehicles and pedestrians that can be dangerously close in proximity, and other VRUs that may present a road hazard, and to avoid collisions before they occur. V2X's benefits are not limited in application to urgent or collision events, and are instead intended to broadly encompass numerous facets of vehicle operation, collective vehicle maneuvering and traffic flow, including, ultimately, applications for vehicle autonomy and driverless cars.

Relevant cellular standards for V2X to date include 3GPP Release 12 involving device-to-device communications, Release 14 incorporated principles in Release 12 to specify V2X. Most recently, principles under development in Release 16 are pertinent to enhanced driving, vehicle platooning and other more sophisticated techniques for driving under the guidance of cellular radio signals.

In addition to exchanging important information between vehicles and between vehicles and pedestrians, vehicles can exchange information with infrastructure that may be dedicated to traffic flow, such as traffic lights and other smart devices through V2I implementations. Equipped with these and other technological implementations, vehicles and pedestrians can use wireless cellular technologies to access real-time traffic, road conditions, upcoming hazards and potential obstacles in a way that the information can be highly reliable and of more immediate utility than information restricted to currently-available positioning solutions, e.g., over GPS navigational systems in automobiles.

V2X may be implemented in a vehicle with a user equipment or cellular device that may in some cases be integrated within, or otherwise dedicated to that vehicle. A vehicle may include sensors and other devices configured to receive ego-measurements and other real-time data. Pedestrians may ideally have in their position smart devices (PUEs) that can be configured to automatedly communicate with vehicles in the proximity and implement the portions of these technologies that are pertinent to the pedestrian.

One advantage of vehicles noted above is that, as a result of their comparative sophistication and size, they may be equipped with robust sensors that enable them to reliably and precisely perform high quality measurements and calculations of the positions, direction and speed of other vehicles and pedestrians. In addition, roadside units (RSUs) featuring sophisticated V2X technologies are emerging and becoming increasingly prevalent in a growing number of regions to assist with receiving and providing information about traffic flow and traffic safety, among other information. Vehicles in transit may utilize these RSUs to obtain accurate positions of both the vehicles and other potential road hazards. RSUs may also be used to extend the range of V2X messages received from a vehicle, and to that end act as a forwarding node. In short, RSUs are new network nodes that are part of the LTE and 5G-based V2X communication system.

A persistent challenge in the art has been the extent of a vehicle's ability to obtain precise measurements of the location or position of a pedestrian in the absence of cellular network availability. The pedestrian may have in his/her possession a smartphone or other device having a GPS sensor. Commercial GPS navigation systems are subject to potential errors of approximately 3-8 meters. While beneficial for driving directions or providing general location information, GPS technology with this margin of error is not sufficient, without more, for coordinating inter-positioning of traveling vehicles at high speeds in opposite lanes of transmit, for example. Likewise, GPS alone is insufficient for alerting pedestrians when traveling vehicles are in their proximity or when a pedestrian is positioned adjacent a roadway and a nearby vehicle needs an accurate measurement of the pedestrian's location.

In addition, even where the pedestrian's GPS receiver is used to attempt to further localize the pedestrian to alert vehicles such that visual or other techniques may subsequently be used, the position information provided by the pedestrian to the vehicle may be noisy due to the heavy urban environment in which the pedestrian may be present. Alternatively, where the vehicle attempts to measure the position of the pedestrian by observing the time of arrival of a ranging signal from the pedestrian, the measurement may be inaccurate, particularly if the vehicle is far enough off from the pedestrian such that the perceived angular change is minimal. The problem is exacerbated where, as is considered herein, neither the vehicle nor the pedestrian have a $U_u$ interface (i.e., conventional network access to the gNB) nor RSU connectivity. Absent access to the cellular network, pages and other safety messages may not be effective means of providing positioning information to alert vehicles of the potential danger or otherwise to coordinate movement of vehicles and/or pedestrians within the region.

Figure 5A:
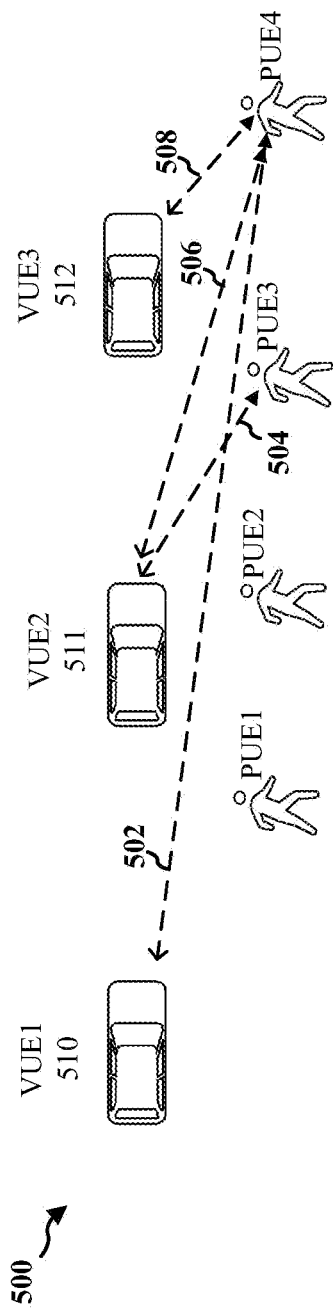
FIG. 5A is a conceptual diagram of vehicle user equipments (VUEs) exchanging ranging signals with different pedestrian user equipments (PUEs) in a V2X network.
Figure 5B:
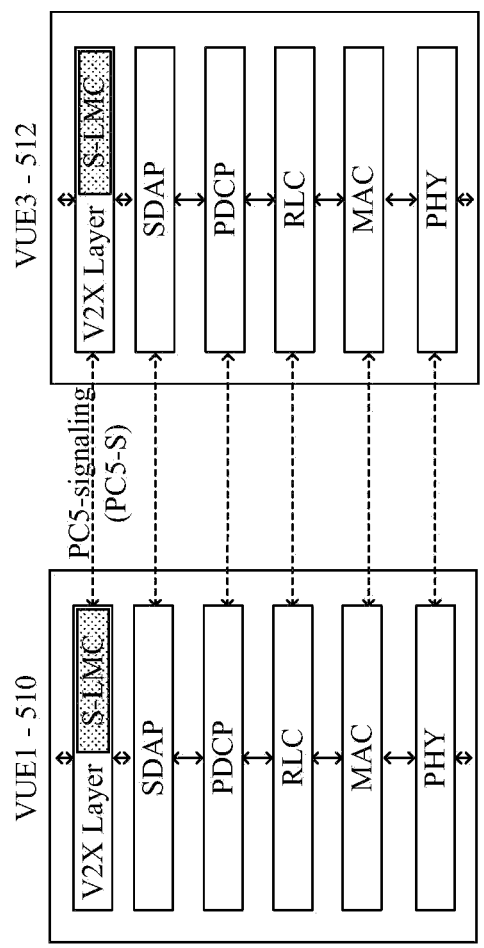
FIG. 5B is a conceptual table showing a hierarchy of software layers for two LMC-capable VUEs and the V2V communications taking place over a sidelink between the VUEs.

FIG. 5A is a conceptual diagram of vehicle user equipments (VUEs) exchanging ranging signals with different pedestrian user equipments (PUEs) in a V2X network. FIG. 5B is a conceptual table showing a hierarchy of layers of the protocol stack for two LMC-capable VUEs (VUE1 510 and VUE3 512) and the V2V communications taking place over a sidelink between the VUEs. It is assumed for the purposes of this illustration that the VUEs 1, 2 and 3 and PUEs 1-4 have no access to the cellular network and therefore only can communicate using a sidelink channel that, as shown in FIG. 5B can be enabled over a PC5 (proximate radio interface) at the V2X layer. The V2X layer includes the layer where the S-LMC (sidelink-location management component) functionality resides. The sidelink channel therefore is available for the VUEs to send and receive position-relevant messages directly to and from one another even in the absence of cellular availability.

Conventionally for cellular traffic over $U_u$, the gNB may send and receive messages with the VUEs/PUEs/UEs using the uplink and downlink cellular channels. In the network architecture, PC5 is defined as an interface between two UEs. PC5 can also be defined in a one-to-many context to enable broadcasts from one UE to many UEs. The sidelink described herein is defined to correspond to the PC5 interface. Thus, via the PC5 interface, the sidelink can have traffic and broadcast channels. Sidelink communications in the context of V2X may be used for safety, including to avoid collisions between vehicles or between a vehicle and a biker, for example.

In FIGS. 5A and 5B, it is assumed that even though the entities are unable to communicate with the gNB or other cellular network, VUE1 and VUE2 are equipped with location management component (LMC) capability or synonymously, location management functionality (LMF). Location management capability enables the vehicle (VUE) equipped with this feature to have the capability at the V2X layer to perform joint localization with other VUEs and PUEs as shown, for example, in FIG. 5A. That is to say, a UE with location management functionality is able to support location determination, e.g., of a PUE, jointly with another VUE. Thus, because VUE1 510 and VUE3 512 include LMC, they can communicate on the sidelink to share resources and jointly make precise determinations regarding the position of another PUE or VUE.

Referring now to FIG. 5A, VUE1 510 and VUE3 512 (but not VUE2 511) include location management capability. As a result, VUE1 510 and VUE3 512 act as "tentative" base stations or RSUs in the sense that they have the ability to process information received from other vehicles as seen by a particular pedestrian, such as PUE4, for example. While VUE2 511 lacks LMC and may not be able to perform global location determinations, e.g., to identify the position of PUE1-4 generally, VUE2 511 can still record local measurements between itself and PUE1, and can pass those measurements to an LMC-enabled VUE.

PUE4 may initially provide its position to a querying VUE. However, as noted above, the position determination may be noisy or based on an unacceptable margin of error, and thus may not be useful for safety regions. Thus, in recognition of this possible error situation, VUE1 510 may prompt the PUEs1-4 to transmit, and be prepared to receive, ranging signals 502, 504, 506, 508 with each of the different VUES 1-3 in the proximity. Thus, PUE4 may send VUE3 a ranging signal 508 and embed within the signal a time at which the signal was transmitted. VUE3 512 may receive the signal and can record the time it was received. Assuming the clocks are synchronized, VUE3 512 can estimate its distance from PUE4. However, even if the clocks are not synchronized, the discrepancy can be corrected by VUE1 510 ensuring that its clock is synchronized with the other VUEs and with PUE4. The devices can exchange synchronization signals, separately or as part of the ranging signals, as necessary.

The ranging signal 508 can subsequently be sent in the opposite direction from VUE3 to PUE4, enabling PUE4 to make the same estimation. The use of a single set of ranging signal between two devices may be insufficient to obtain position information. In addition, the ranging signals may be corrupted by the presence of obstacles or noisy environments between the sender and recipient.

For example, VUE1 510 may see a pedestrian (having a PUE) that VUE3 512 currently cannot see, or vice versa. In FIG. 5A, VUE1 may be a significant distance from PUE4, or an obstacle may be present, for example, such that VUE1 cannot determine with any precision its distance from PUE4 based on a ranging signal 502 received from PUE4. VUE1 may alternatively calculate a position of PUE4 that is much farther than other vehicles. By contrast, VUE3 may be very close to PUE4 and may receive a ranging signal 508 that is accurate. The measurements between VUE3 512 and PUE4 may demonstrate, for example, that VUE3 is four meters away from PUE4. VUE3 512 can forward this information about PUE4 to VUE1 510. VUE2 511 may also provide its measurement information to VUE1. By receiving the shared ranging information from multiple VUEs regarding PUE4, VUE1 510 can use its LMC functionality to process these multiple estimates and thereby determine the location of the pedestrian. In an aspect of the disclosure, VUE1 510 may also share a sidelink with VUE3 512 (the latter of which also includes LMC). VUE1 510 and VUE3 512 can collectively estimate location of PUE4 not simply from their own measurements, but from the collective measurements of the VUEs in the vicinity. Further, the sharing of processing resources between VUE1 510 and VUE3 512 can allow the position location to be determined very quickly, and all without any access to the cellular network.

It should be noted with reference to FIG. 5A that these principles may be equally applicable to the other PUEs1-3. For example, VUE2 511 and PUE3 may exchange ranging signals, collect the information and forward it to one or both LMC capable VUEs as a first step to determining the location of PUE3. In various implementations, each VUE1-3 in the vicinity can make bilateral ranging measurements with PUE4 (with PUE4 sending the ranging signal in the first instance, for example, and PUE4 receiving the ranging signal secondly, and then with PUE4 sending their recording signal arrival times to the corresponding vehicle.)

Another factor in the overall determination of locations is the relative positioning of VUEs1-3. It is generally understood that the vehicles, being larger, technically more sophisticated and having more room to house equipment, are likely to have advanced sensors that are much more precise than those available to PUE4. Thus, the vehicles VUE1-3 are likely to know their positions with a greater degree of accuracy and the can accurately and expediently communicate their positions to each other. In addition, via the sidelink shared with each other, VUE3 512 can communicate with VUE1 510 and provide its measurements that PUE4 is four meters away. Thus, rather than rely on its own noisy and potentially inaccurate measurements, VUE1 510 can instead use the information provided by VUE3 along with VUE1's own information to precisely estimate the position of PUE4. In this case, VUE1 510 can effectively jointly estimate with VUE3 512 the location of PUE4 using information it previously received from VUE1 and its LMC-equipped capability.

Using this strategy, VUE2 511 can also determine the position of PUE4 so that it can avoid PUE4 in the event the two are in dangerous proximity. VUE2 511 may be behind a concrete barrier when it attempts to exchange ranging signals 506 with PUE4. Since VUE3 512 has a better fix on PUE4, VUE2 (even though not LMC-enabled) can nevertheless request the position information from VUE3. VUE2 can determine the position of PUE4 not only based on VUE2's measurement of PUE4, but also based on VUE3's more accurate measurements.

One shortcoming with the above approach is that VUE2 511, not itself being LMC-enabled, must somehow be informed which vehicles in the region are in fact LMC-capable so that it can send its local measurements to an LMC-based source equipped to make global position determinations for each device in the region.

Accordingly, in another aspect of the disclosure, each LMC-enabled VUE broadcasts its capability to offer location management functionality as part of a layer 1, layer 2, or layer 3 (L1/L2/L3) message, such as periodically every T seconds. This broadcast may beneficially enable each of the PUEs and VUEs in the vicinity to acquire this knowledge so that as necessary, a particular PUE/VUE can message the broadcasting LMC-enabled VUE for assistance in making location determinations.

Thus, still referring still to FIG. 5A, VUE2 511 may be in a collision course with PUE3. VUE2 511 may know through its own ranging measurements that PUE3 is generally in the vicinity, but the accuracy of the measurements is uncertain. VUE2, which lacks LMC capability, may also lack any information from other VUEs. However, VUE2 may be informed via VUE1's periodic broadcasts that VUE1 has location management functionality. Equipped with this knowledge, VUE2 can send a message to VUE1 510 asking about the position of PUE3. Parenthetically, all vehicles in the vicinity would have the identifier (ID) of PUE3, since the PUEs1-4 periodically broadcast this information using the lower layers. Thus VUE2 can specifically reference the identifier (ID) of PUE3 in the message to VUE1 510.

In a manner described above similar to PUE4 and the collective use of ranging signals 502, 506 and 508 to enable VUE1 to localize PUE4 jointly with information from VUE3, VUE1 510 and VUE3 512 may perform a similar technique with PUE3 to ascertain PUE3's location. VUEs in the proximity may again exchange ranging signals with PUE3. VUE1 and VUE3, now known to include LMC capability via their collective broadcasts, receive the location information from other VUEs (here, VUE2) based on the ranging signal exchange and related parameters (time of arrival, angle of arrival etc.). VUE1 510 and VUE3 512 can also directly exchange this location information, and their own measurements, over the sidelink. VUE1 and VUE3 can use the relative information from the distributed measurements to determine a precise position of PUE3. The more the participants in the measurement process, the more precise the location. The resulting location information about PUE3 can be provided by VUE1 510 to both VUE2 and PUE3, and the two can back off or change direction as necessary to avoid a collision.

In another configuration referenced in part above, VUE1 510 and/or VUE3 512 can provide the determined position to the different pedestrians PUE1-4 in the vicinity. It may be the case, for example, that PUE3's GPS was misidentifying the position of PUE3 due in part to a noisy environment. VUE1 may message PUE3 to inform the latter update it position, even though the updated position may be different than the position identified by PUE3's own GPS. An advantage of this feature is that, even if a collision course with PUE2 (as described in the above example) were not imminent, PUE3 can provide the corrected position to a requesting VUE rather than its own erroneous GPS position. The corrected position can then be used for more accurate subsequent measurements. For example, the VUEs may use, or PUE3 may provide, an updated location estimate of PUE3 in connection with a global position update, which in turn may affect the previously determined position of PUE2.

In addition to the ranging signals discussed with reference to FIG. 5A, the various VUEs and PUEs can message each other to take ego measurements to calculate ego-motion information and position. In ego-positioning, the vehicles may use their more advanced sensors to identify relative positions for PUEs location by downloading visual cues such as local 3-D scenery models along the route. When driving, the approximate position of the vehicle can be known using its GPS receiver, and the current image of the vehicle can be matched with the associated local 3D model.

In another implementation that can be used for overall determination of location information, the relative positions of a PUE (or any of them) can be obtained by one of the VUEs taking visual measurements with its sensors concurrent with its messaging of one of the PUEs. Thereafter an LMC-enabled VUE may use these visual "ego-measurements" together with a corresponding message received from the same PUE that was messaging the VUE during the ego measurements. The LMC-enabled VUE can correlate the visual information with the times and/or positions from the PUE's message to determine when the visual information was measured. This information can be collected for all VUEs and PUEs. Ego measurements for all vehicles and pedestrians can be taken, consolidated by the LMC-based VUEs, and used in concert with ranging information to make accurate location determinations without cellular network involvement.

As another example, VUE1 510 may report to VUE3 512 in a message what VUE1's sensors observed when messaging with one of the PUEs. All three VUES1-3 may make similar measurement reports, namely, what their sensors observed when exchanging messages with an identified one of the PUEs. The three VUEs thereupon send their measurement reports to the two LMC-capable VUEs 1 and 3. In FIG. 5A, VUE2 511 may take the ego-measurements and then make two such reports, one each to VUE1 510 and VUE3 512. VUE3 512 and VUE1 510 may also take the ego-measurements and then each make one report to the other, for an overall total of four pedestrian measurement reports.

Then the PUEs involved in the messaging during the VUE's measurements of the ego information all report their positioning measurements that they performed with the VUEs1-3 to the LMC-capable VUEs 1 and 3. Thus, in this example, there are two communications sent from PUE4, one to VUE1 and one to VUE3. After these signals are all transmitted. VUE1 and VUE3 can use all of the received information to jointly determine the location of PUE4. For instance, VUE1 510 can analyze the visual information recorded in a message from VUE2, which message further indicates that at some time ti during the original recording of the visual information, a message from PUE2 was received, and at some other time t 2 during the recording by VUE2, a message to PUE2 was transmitted. VUE1 can then analyze times and/or positions from the corresponding PUE2 measurements subsequently reported to VUE1 510 by PUE2 to determine precisely when from PUE2's perspective those visual measurements were recorded. VUE1 can use this relative position in concert with relative positions based on the other VUE ego measurements and times/positions in corresponding reported PUE measurements (together with ranging measurements in some configurations) to determine location information in jointly localizing the desired PUE with VUE3 512.

Figure 6A:
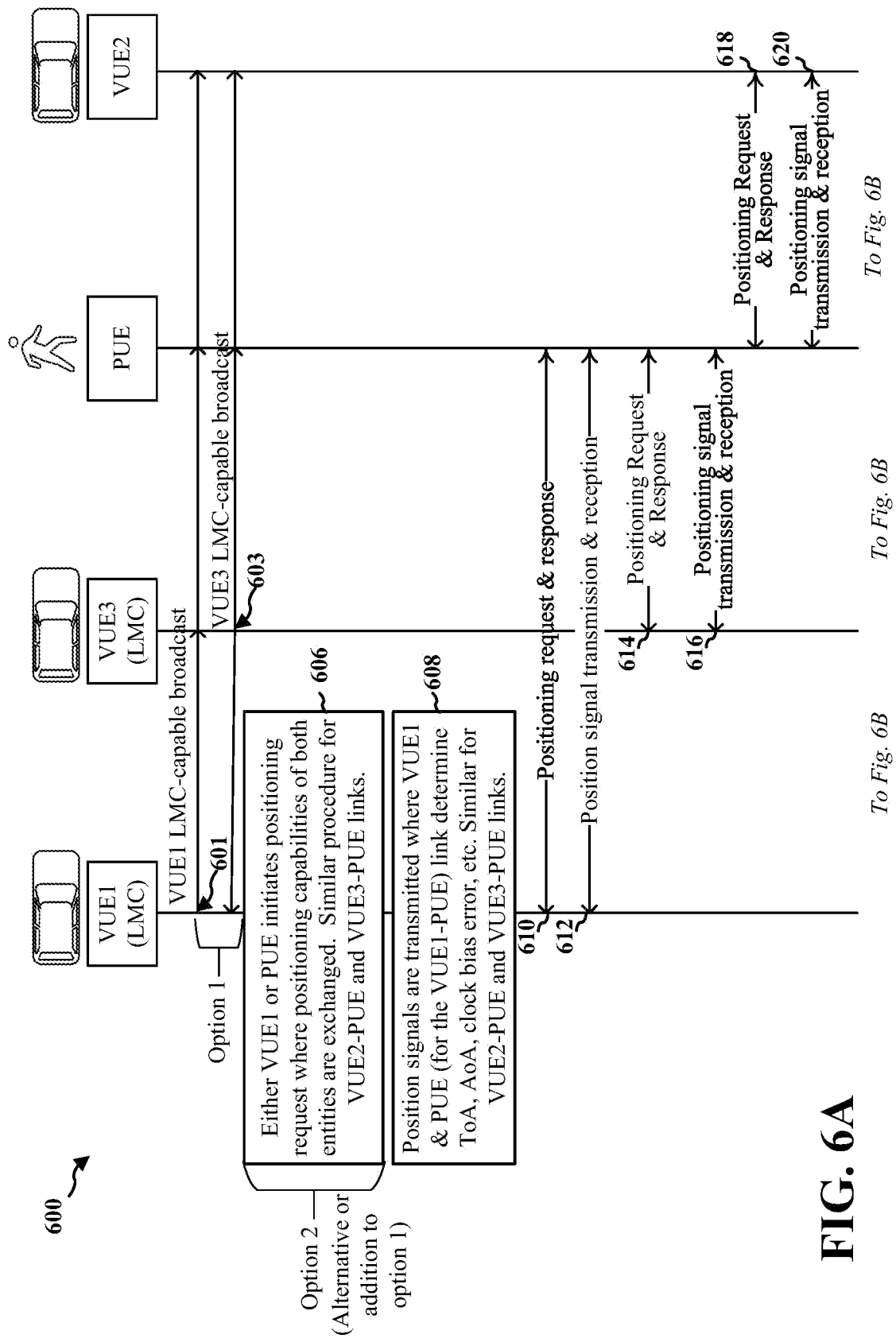
FIGS. 6A, 6B and 6C illustrate an exemplary signaling diagram of sequential messages between different VUEs and a PUE in a V2P system.
Figure 6B:
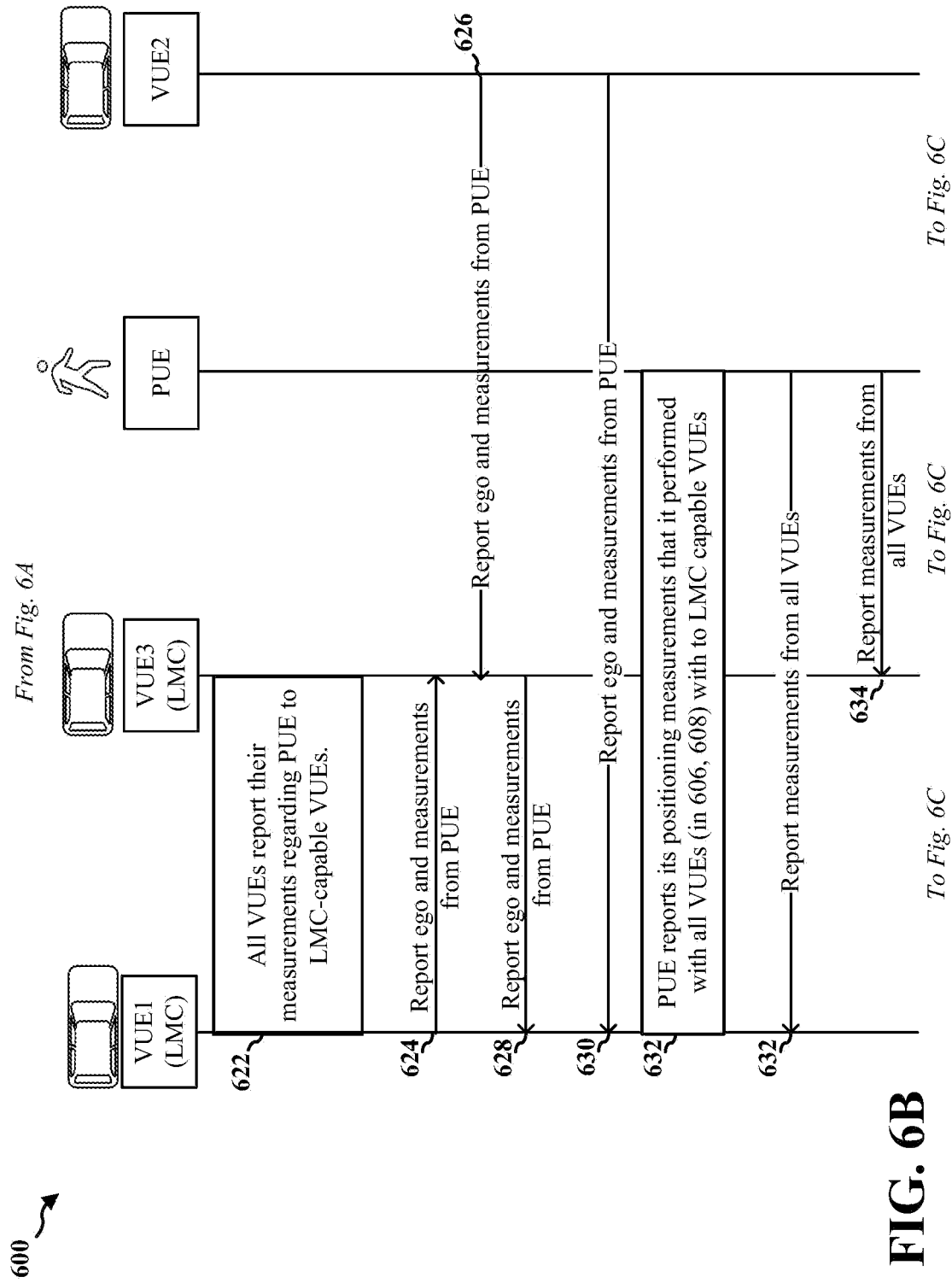
Figure 6C:
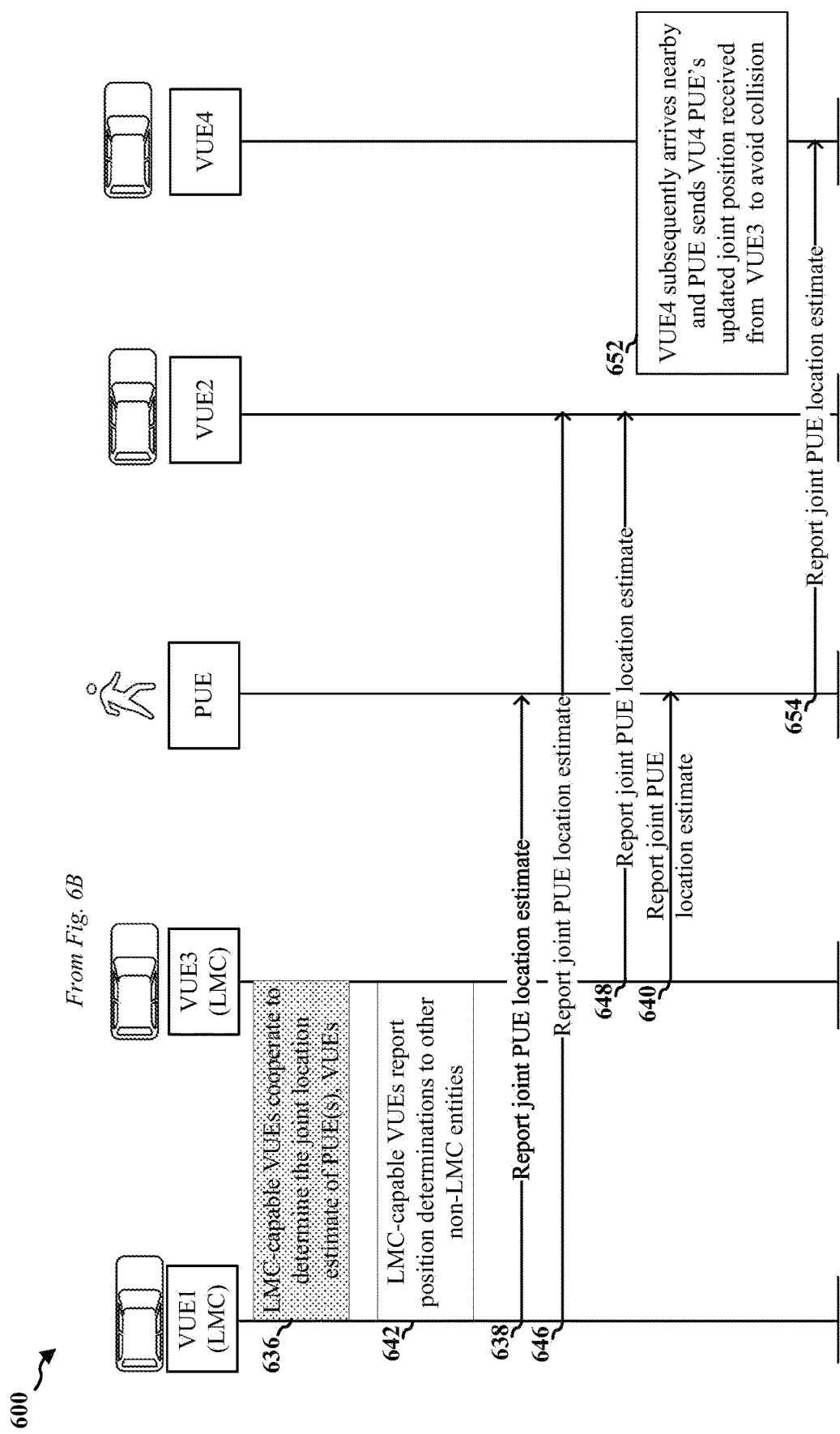

FIGS. 6A, 6B and 6C illustrate an exemplary signaling diagram 600 of sequential messages between different VUEs and a PUE in a V2P system. For these purposes it is assumed that no cellular capability is available in the region. Referring first to FIG. 6A, three vehicles corresponding respectively to VUE1, VUE3, and VUE2 are shown. One pedestrian carrying mobile device PUE is also shown. Initially, at 601, VUE1 broadcasts during a layer 1/2/3 periodic message its LMC capability. At 603, VUE3 broadcasts its LMC capability in a similar manner. The broadcasts reach each receiving device.

The two broadcasts are collectively labeled as "option1" in the figure for ease of illustration. In alternative configurations such as in block 606, in lieu of broadcasting LMC capability, the entity that requires LMC capability requests from one or more VUEs in the region their positioning capabilities. After these initial requests are made, location information may be exchanged for all entities in the region using V2X or L1/L2/L3 messaging/paging, via sidelink, or by other suitable means. For example, PUE may request in signal group 610 whether VUE1 has LMC capability, and PUE may make a similar request to VUE2 in signal group 618, and VUE3 in signal group 614. VUE1, VUE2, and VUE3 may respectively respond to PUE with messages to PUE in signal groups 610, 614 and 618 with their initial positions (in some configurations) and their LMC capability, or absence thereof. The information ascertained from these requests by PUE may be passed along to other VUEs or PUEs, if applicable. In some configurations, the PUE/VUE that requires the LMC capability may request this information (and exchange their own capabilities) at the RRC layer, such as a part of a RRC connection set-up, for example.

It should be understood that while block 606 is characterized as "option 2", in some configurations the signaling activity described in block 606 may be an alternative technique, and in other configurations block 606 may be an additional technique to augment the broadcasts in option 1. For example, the actions may be redundant to ensure all devices are alerted, or the positioning capabilities exchanged in 610, 614 and 618 are additional or different from location management capability provided in the broadcasts 601 and 603. In addition to receiving broadcasts from the LMC-capable VUEs, one of the entities may also initiate a request for localization of PUE, which may occur in block 606. In short, options 1 and 2 (or portions thereof) may both be used separately in some configurations, and jointly in some combination in other configurations.

Thus, at block 606, either VUE1 or PUE may initiate a positioning request for localizing PUE, such that positioning capabilities for both entities are exchanged. Similar procedures are conducted in both directions for VUE2-PUE and VUE3-PUE. This exchange is explicitly shown in the signal groups 610 (for VUE1 and PUE), 614 (for VUE2 and PUE) and 618 (for VUE3 and PUE). At block 608, position signals representing location information are exchanged. Examples include ranging signals, signals used for ego measurements, and location information derived from each of these exchanges, such as (among others) time of arrival (ToA), angle of arrival (AoA), clock bias errors, etc. The measurements may be bi-directional such that separate ranging signals can be sent to both communicating UEs (e.g., VUE2 and PUE). While the ego measurements are typically conducted by the VUEs, which may include the more sophisticated sensors for use with this procedure, in more advanced implementations the PUE may be operable to make ego measurements as well. For each link, each of VUE1-PUE, VUE2-PUE and VUE3-PUE separately may exchange the ranging and position signals in a bidirectional manner (e.g., in sequential order), as shown in signal groups 612, 616, and 620.

Referring now to FIG. 6B (which sequentially continues from FIG. 6A), as described in block 622, all UEs (both VUEs and PUEs) may report their measurements and parameters determined from the above operations 612, 616 and 620 to the LMC-capable VUEs-VUE1 and VUE3—as may be known either from the broadcasts 601, 603 of option 1 or the exchange of capabilities (block 606) of option 2. VUE2 thus sends its ego and ranging measurements, and other location information, to VUE3 (signal 626) and to VUE1 (signal 630). VUE1 provides its measurements and other location information to VUE3 (signal 624) and VUE3 transmits its measurements and other location information to VUE2 (signal 628).

Thereupon, as described in block 632, PUE reports its positioning measurements and other location information that it performed with all VUEs (e.g., in connection with blocks 606 and 608) to VUE1 (signal 632) and VUE3 (signal 634).

Referring now to FIG. 6C (which sequentially continues from FIG. 6B), as described in block 636, the LMC-capable VUEs (i.e., VUE1 and VUE3) cooperate over the established sidelink to use the location information to determine relative positions of the entities and to determine a joint location of PUE and the three VUEs. (In this example, VUE4 appears in the region later). Thus, for example, VUE1 and VUE3 may logically partition the location information into categories that each of VUE1 and VUE3 separately use to determine locations of the entities. As an illustration, VUE1 and VUE3 can take into account one or more GPS measurements to identify a general region or area that can assist in jointly localizing the PUE and other VUEs. VUE1 and VUE3 can thereupon use the location information or measurement determinations made by each entity during the exchange of ranging signals to help establish relative positions of the entities. Further, in configurations where ego measurements were made, one or both of VUE1 and VUE3 can review the visual cues or other information taken by the applicable VUE and then correspond that visual information with a time and/or a position (using location information such as ToA, etc.) derived based on reported measurements 632 and 634 (FIG. 6B) made by the PUE, with whom the applicable VUE was corresponding at the time the VUE was sensing the visual cues. In some configurations, additional ego measurements can be taken (e.g., where other PUEs are present). All of this time and location information can be organized in a meaningful way using the processors of VUE1 and VUE3, and positions can estimated and/or precisely determined for each entity, for example, including PUE. In some configurations, VUE1 can perform the processing for the locations using location information received from VUE3 that was not available to VUE1 (e.g., because VUE1 is behind an obstacle while VUE3 is not). During the progressive locations, it will be appreciated that VUE1 an VUE3 may be issuing signals to and from one another to exchange information and to partition the responsibilities of each LMC-enabled VUE so that the determination can be made as quickly, efficiently and precisely as possible to timely avoid a collision event.

As described in block 642, the LMC-capable VUEs (VUE1 and VUE3) report the position determinations to the other non-LMC entities. VUE1 provides this information to PUE and VUE2 (signals 638 and 646, respectively). VUE3 reports the information it has to PUE and VUE2 (signals 640 and 648, respectively). In other configurations, a single one of the LMC-based VUEs may instead be dedicated to providing the joint information. In some configurations, receiving the information from both entities may provide a helpful redundancy, particularly if a collision is imminent or an obstacle gets in the way of one of the VUEs. The information provided by VUE1 and VUE3 to a given entity as described in block 642 may be the same, or different.

With the necessary location determinations now provided to devices in the region, one or more of the VUEs and/or the PUE can take quick remedial measures, if necessary, to avoid a collision, or to increase safety by separating distances further. For example, if VUE1 and VUE2 were traveling down the same stretch of road, the location information may deduce that they were too close. They may adjust their position as a result.

In another configuration, another VUE, VUE4 arrives in the region after the calculations described above. PUE may send VUE4 PUE's position information as determined by VUE1 and VUE3, and as described in block 652. In this example, it is assumed that PUE's position information as identified by its own GPS receiver is erroneous. Thus, one advantage of the principles herein is that PUE can transmit to VUE4 the position of the PUE that was instead just computed using ranging and ego measurements and is known to be accurate with a much greater degree of precision as compared with PUE's GPS. In addition, provided the information is sufficiently current (e.g., PUE is seated on a park bench and its position remains identical), PUE can use the updated, more accurate position information in connection with subsequent measurements that may be initiated by other arriving VUEs/PUEs, or subsequently by PUE itself. For instance, as noted, PUE may provide the updated position information of itself to VUE4 (signal 654).

One question that may arise in the example of FIGS. 6A-C is how the reporting of the locations should be handled given the differing variety of entities that may be involved in a given region. For example, a larger number of LMC-capable VUEs than reasonably anticipated may be present in a given region. To avoid squandering time in a situation in which a pedestrian collision or a vehicle accident could be imminent, a procedure should be implemented that places guidelines regarding which entity(ies) should be assigned the duty to make measurements or calculations in a region, and conversely, which entities should defer participation (or perform other designated actions) during specific times in the process. As is evident from the number of entities in FIGS. 5A and 6A-C, for example, VUE2 may not be able to adequately reconcile the ranging requests, or PUE may need information that at least at the outset it is not sure how to acquire.

Figure 7:
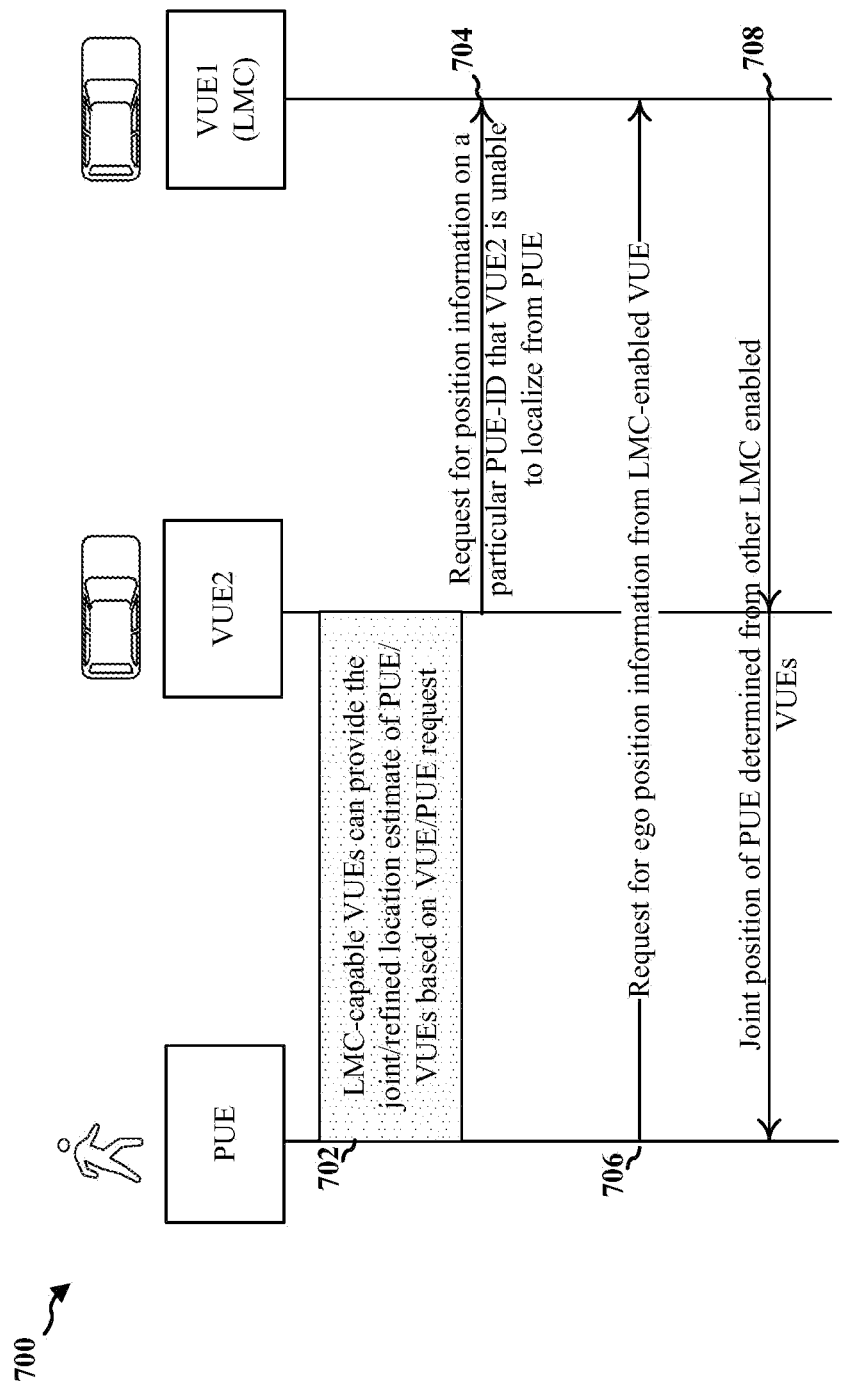
FIG. 7 is an exemplary signaling diagram of sequential messages between different entities in a V2P system.

Accordingly, in another aspect of the disclosure, a collection of alternative location reporting procedures is disclosed. To this end, FIG. 7 is an exemplary signaling diagram of sequential messages between different entities in a V2P system. In one implementation, the LMC-capable VUEs provide the entities in the region with the joint (or refined) location information, including location determinations, based on a VUE/PUE request (block 702). For example, VUE2 may issue a request to VUE1 for the positioning information concerning a particular PUE based on that particular PUE's L1/L2/L3 identifier (signal 704). The nature of the request as specific to VUE1 may stem from a prior broadcast from VUE1 of its LMC capability, or it may be known from a prior information exchange (e.g., block 602 of FIG. 6A) or an RRC setup. VUE2 may need this information for various reasons. For example, VUE2 may have made the request because it is unable to localize the identified PUE due to a high variance in the received/reported measurements from that PUE, in turn suggesting that the measurements are unreliable or incorrect.

As another example, a PUE that has reason to question the integrity of its own location measurements may request its own ego position information from VUE1 (signal 706), the latter of which PUE knows to have LMC capability based on a prior communication. VUE1 can thereupon determine a joint position of the PUE using another LMC-enabled VUE (signal 708).

In another implementation, periodic location reporting about a PUE is transmitted. For example, VUE2 (FIGS. 6A-C) can infer the presence of one or more PUEs (such as by receiving a previous P2V message) and can request one or more LMC-capable VUEs to provide position determinations for the identified PUEs once every T seconds (signal 704).

Alternatively or in addition, a PUE can subscribe to another LMC-capable VUE (e.g., a stationary VUE in a parking lot) to seek the PUE's own position or the position of other VUEs in the vicinity. The recipient VUE can, in turn, reconfigure the identity of the PUEs about which it is seeking location information, such as by issuing an RRC reconfiguration message, or the like. For example, to minimize unnecessary reporting and maximize efficiency, the VUE can provide the reconfiguration message to terminate reporting location information on a subset of PUEs after they exit the field of view of the corresponding vehicle.

In still another implementation, the reporting can be triggered in response to an event. VUE (e.g., VUE2 in FIG. 6A) may configure the criterion for triggering the event using an RRC configuration message. For example, a set of preconfigured conditions may be defined that trigger an event. VUE2 may request that an LMC-enabled VUE (e.g., VUE1) enable one or more such conditions. An exemplary condition may be, where the variance in position measurements reported by VUE2 with reference to a particular VUE exceeds a threshold, VUE1 may jointly localize the PUE (e.g., with VUE3) and provide the determined joint location of the PUE to VUE2. Another example of an event-triggered condition is where VUE2 reports about a PUE for the first time to the LMC-capable VUE1, the latter may send PUE location information to VUE2 for the next Ti seconds.

Figures 8A, 8B:
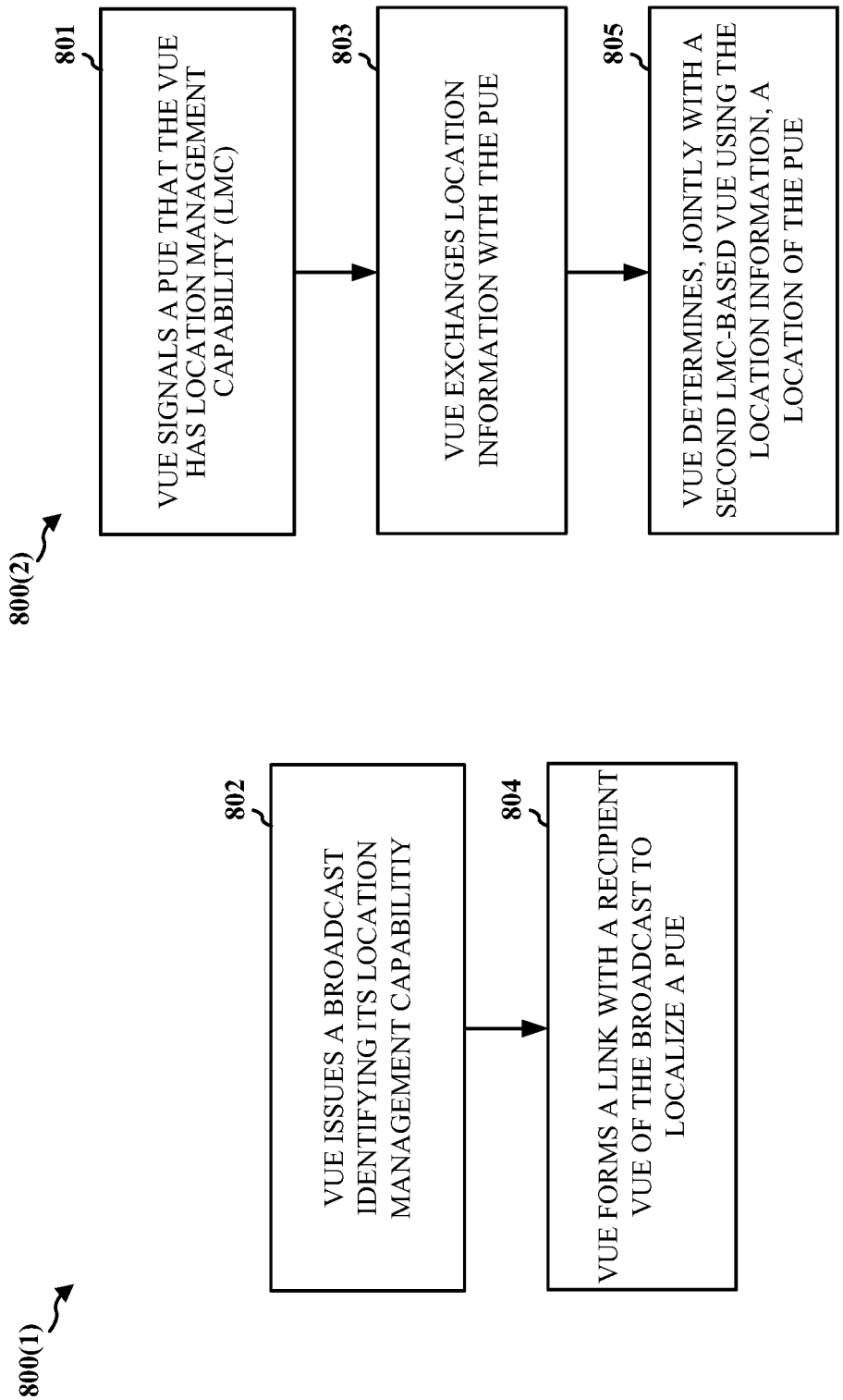
FIGS. 8A and 8B are flowcharts of methods of wireless communication.

FIGS. 8A, 8B are flowcharts 800(1), 800(2) of methods of wireless communication. Referring first to the flowchart 800(1) in FIG. 8A, at step 802, a VUE may issue a broadcast identifying to devices in its relative proximity that it has location management capability. At step 804, the VUE may thereafter form a link with a recipient VUE of the broadcast to localize a PUE. The localization may occur by exchanging location information through ranging and ego measurements as described at length with reference to FIGS. 6A-C, for example. Relative positions can be deduced based on the exchanged location information and the LMC-enabled VUEs can cooperate over a sidelink to jointly localize, or jointly determine a location of, the PUE at issue. In other configurations, determinations can be made by the LMC-enabled VUEs about other devices in the proximity using these techniques, including determinations about the locations of the LMC-enabled VUEs themselves.

Referring next to the flowchart 800(2) in FIG. 8B, a VUE at step 801 may signal, based on a request from a PUE or otherwise, the PUE that the VUE has location management capability (LMC). At step 803, the VUE thereupon exchanges location information with the PUE in a manner described above. Based on the exchanged information, and optionally with location information obtained from other participating sources in the proximity, at step 805, the VUE determines with a second LMC enabled UE using the location information, a location of the PUE.

Figure 9:
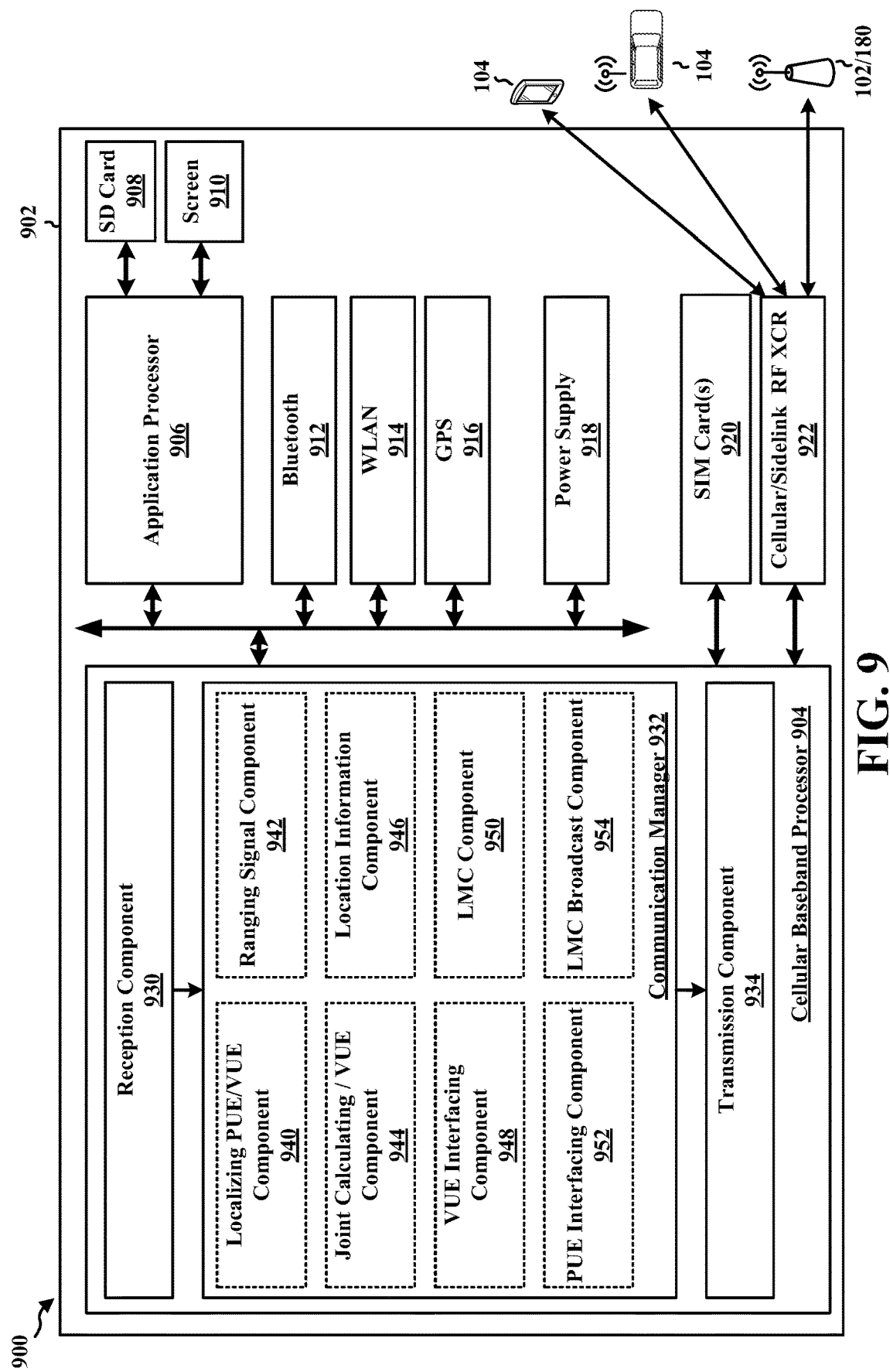
FIG. 9 is a diagram illustrating an example of a hardware implementation for an example VUE having LMC capability.

FIG. 9 is a diagram 900 illustrating an example of a hardware implementation for an apparatus 902. The apparatus 902 is a UE, such as a VUE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104, which may include one or more VUEs and/or PUEs 104, and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described above. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforementioned additional modules of the apparatus 902. The UE 902, e.g., VUE 104 (FIG. 1) may be in communication with a pedestrian UE (PUE) 104, another VUE 104, and a base station such as a gNB (102, 180).

The communication manager 932 includes a localizing PUE/VUE component 940 that is configured to exchange information with a PUE or other component to localize the PUE or other component, e.g., as described in connection with reference to the VUE localizing the PUE in step 804 of FIG. 8A and to determine a location of the PUE in step 805 of FIG. 8B. The communication manager 932 further includes a ranging signal component 942 that receives input in the form of ranging signals from other VUEs and PUEs from the component 940, and is configured to identify times and angles of arrival, clock errors, ego positioning information, and other location information such as described in connection with block 608 and corresponding signals from FIG. 6A. The communication manager 932 further includes a joint calculating/VUE component 944 that receives input in the form of location information from the component 942 and is configured to calculate relative positions of devices based on information in ranging signals, e.g., as used in the localization of the PUE in step 804 of FIG. 8A and step 805 in FIG. 8B and as described in connection with block 608 and the corresponding signals in FIG. 6A.

The communication manager 932 further includes a location information component 946 that may receive input in the form of location information from component 942 and ranging signals from the component 940. The location information component 946 may generate location information specific to the region or relative proximity where the VUE at issue is currently located, and the location information component may receive other location information based on the ranging signals and ego information it receives from other components or from the reception component 930 in which signals can be received. This information may be used in step 804 of FIG. 8A and steps 803 and 805 of FIG. 8B, for example, to exchange the necessary location information for localizing the PUE and to make determinations about positioning based in part on the location information. This information may also be used in block 636 of FIG. 6C when determining the location estimate of a requesting device.

Referring still to FIG. 9, the communication manager 932 may also include a VUE interfacing component 948. The purpose of this component may be to receive information in messages received at reception component 930 from other devices in the region and to determine the nature of the VUE, such as whether the VUE has location management capability (as determined from input received from component 950, for example) and whether the VUE is making a request for its own position or the position of another. This information may be used in step 804 of FIG. 8A and 805 of FIG. 8B for determining whether to interface with another LMC-based VUE to localize a PUE, and in block 801 of FIG. 8B to determine whether to signal that the VUE has LMC capability. This information may also be used in block 622 and the corresponding signals 624, 628 and 630 in FIG. 6B to determine how to process information received from other devices and whether to use location management functionality.

As noted, the communication manager 932 may further include LMC component that may be used for making joint localization determinations in step 804 of FIG. 8A, step 805 of FIG. 8B, and blocks 636 and 642 and signals 638 and 646 of FIG. 6C. The communications manager 932 may also include PUE interfacing component 952 for receiving input in the form of location information originating from PUEs in component 942 and for receiving input in the form of ranging signals and positioning reports for ego measurements from component 940 for use in localizing the PUE in step 804 of FIG. 8A and determining a location of the PUE in step 805 of FIG. 8B, as well as signaling a PUE in step 801 of FIG. 8B.

The communication manager 932 of the VUE in FIG. 9 may also include an LMC broadcast component 954 that receives information from LMC component 950 and for using that information for broadcasting its LMC capability as in step 802 of FIG. 8A and in signal 601 of FIG. 6A. The information in LMC broadcast component 954 together with the information in LMC component 950 may be used to identify a region or relative proximity in which to transmit V2X signals using input in the form of location information for localizing a PUE from component 946 and VUE and PUE interfacing components 948 and 952 to send information pertaining to the VUE's positioning capability as in step 801 in FIG. 8B and block 606 and corresponding signals 610, 614 and 618 in FIG. 6A.

The apparatus may include additional components that perform each of the blocks of the algorithm in the aforementioned flowcharts and timing diagrams of FIGS. 6A-C and 8A-B. As such, each block in the aforementioned flowcharts and timing diagrams may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for means for issuing a broadcast identifying a location management capability of the VUE and means for forming a link with a recipient VUE of the broadcast to localize a pedestrian UE (PUE). The aforementioned means may be one or more of the aforementioned components of the apparatus 902 configured to perform the functions recited by the aforementioned means. As described above, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The principles of this disclosure advantageously facilitate safety and autonomous activity in its applicability to vehicle and pedestrian user equipment. Thus, the principles herein in large part provide key benefits by enabling key features of systems that are expected to increase in prevalence. Given that cellular networks and GPS receivers are not reliable solutions in and of themselves for localizing vehicles and pedestrians and therefore promoting safety and in due course autonomous driving, the development of other solutions is deemed paramount. Those other solutions came in part in the general form of V2X, whose specification is being promulgated in existing cellular standards, which are in use today and which may be in widespread implementation in the near future.

V2X, however, is not without its limitations when practically implemented, and it presented problems in managing how devices with different calipers of technology could merge to localize devices in a rapid yet efficient manner. Accordingly, in one aspect of the disclosure as provided herein, critical LMC capability can now be readily made known to devices in a region through broadcasts such that the correct exchange of signals can take place between those devices in advance of a safety hazard. Localization techniques based on the use of these broadcasts are also disclosed, including the joint localization of a PUE or other VUE in which advantageously, the processing power of two VUEs can be harnessed to quickly identify the relative proximity, and the precise location of, a pedestrian in the vicinity of high-speed vehicles. The joint localization techniques can advantageously make use of VUEs and PUEs in the vicinity regardless of whether they included LMC capability in order to obtain reliable location information even in the presence of noise and interfering obstacles and without the benefits of a network.

In alternative configurations, a PUE or VUE having a need to know the location of another entity can query proximate VUEs for this information. Alternatively or in addition, positioning information can be exchanged up-front by using targeted signaling to convey the identity of LMC-capable VUEs to affected devices in the vicinity. Those devices in need of location information, without cellular availability, and with large fluctuations in position due to a noisy or inoperative GPS receiver that itself has inherent accuracy limitations, can use the principles herein to quickly obtain position information needed by the device to maintain safety, or to navigate in the proper direction.

One challenge addressed herein includes how to report the potentially large amount of location information, particularly when more than a few VUEs have LMC capability in the region in question. In particular, a number of reliable techniques for reporting information are disclosed herein, including localization of devices upon request, periodically, or in response to a specified trigger event. These instances limit the scope of the reporting of location information and the use of joint localization to that which is necessary under the circumstances, and these mechanisms avoid producing a bottleneck in the system in which too many devices are active than necessary to support efficient and rapid cellular-free localization that occurs only when necessary.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a vehicle user equipment (VUE), comprising:
    signaling a pedestrian user equipment (PUE) that the VUE has location management capability (LMC);
    exchanging location information with the PUE; and
    determining, jointly with a second LMC-based VUE using the location information, a location of the PUE on a periodic basis based on a request.

2. The method of claim 1, further comprising determining the PUE location based on a request to the VUE from the PUE or the second VUE, the request including a PUE identifier.

3. The method of claim 1, further comprising determining the PUE location based on a triggered event.

4. The method of claim 3, wherein the triggered event corresponds to a determination that a variance in position measurements reported by the second LMC-based VUE with reference to a particular VUE exceeds a threshold.

5. The method of claim 3, wherein the triggered event corresponds to the second LMC-based VUE reporting about the PUE for a first time to the VUE.

6. The method of claim 3, wherein the triggered event may be configured using an RRC configuration message.

7. The method of claim 1, wherein the location of the PUE is determined jointly with the second LMC-based VUE using the location information over a sidelink.

8. The method of claim 1, further comprising:
    determining, jointly with the second LMC-based VUE using the location information, a location of the second LMC-based VUE using the location information.

9. A vehicle user equipment (VUE), comprising:
    a processor configured to:
    signal a pedestrian user equipment (PUE) that the VUE has location management capability (LMC),
    exchange location information with the PUE, and
    determine, jointly with a second LMC-based VUE using the location information, a location of the PUE on a periodic basis based on a request.

10. The VUE of claim 9, wherein the processor is further configured to determine the PUE location based on a request to the VUE from the PUE or the second VUE, the request including a PUE identifier.

11. The VUE of claim 9, wherein the processor is further configured to determine the PUE location based on a triggered event.

12. The VUE of claim 11, wherein the triggered event corresponds to a determination that a variance in position measurements reported by the second LMC-based VUE with reference to a particular VUE exceeds a threshold.

13. The VUE of claim 11, wherein the triggered event corresponds to the second LMC-based VUE reporting about the PUE for a first time to the VUE.

14. The VUE of claim 11, wherein the triggered event may be configured using an RRC configuration message.

15. The VUE of claim 9, wherein the location of the PUE is determined jointly with the second LMC-based VUE using the location information over a sidelink.

16. The VUE of claim 9, wherein the processor is further configured to:
    determine, jointly with the second LMC-based VUE using the location information, a location of the second LMC-based VUE using the location information.

17. A non-transitory computer-readable medium storing computer-executable code for a vehicle-enabled user equipment (VUE), the code when executed by a processor causes the processor to:
    signal a PUE that the VUE has location management capability (LMC);
    exchange location information with the PUE; and
    determine, jointly with a second LMC-based VUE using the location information, a location of the PUE on a periodic basis based on a request.

18. The non-transitory computer-readable medium of claim 17, further comprising code to determine the PUE location based on a request to the VUE from the PUE or the second VUE, the request including a PUE identifier.

19. The non-transitory computer-readable medium of claim 17, further comprising code to determine the PUE location based on a triggered event.

20. The non-transitory computer-readable medium of claim 19, wherein the triggered event corresponds to a determination that a variance in position measurements reported by the second LMC-based VUE with reference to a particular VUE exceeds a threshold.

21. The non-transitory computer-readable medium of claim 19, wherein the triggered event corresponds to the second LMC-based VUE reporting about the PUE for a first time to the VUE.

22. The non-transitory computer-readable medium of claim 19, wherein the triggered event may be configured using an RRC configuration message.

23. A vehicle-enabled user equipment (VUE), comprising:
    means for signaling a pedestrian user equipment (PUE) that the VUE has location management capability (LMC);

means for exchanging location information with the PUE; and means for determining, jointly with a second LMC-based VUE using the location information, a location of the PUE on a periodic basis based on a request.

24. The VUE of claim 23, further comprising:

means for determining the PUE location based on a request to the VUE from the PUE or the second VUE, the request including a PUE identifier.

25. The VUE of claim 23, further comprising:

means for determining the PUE location based on a triggered event.

26. The VUE of claim 23, further comprising:

determining, jointly with the second LMC-based VUE using the location information, a location of the second LMC-based VUE using the location information.

* * * * *